May 2, 1933. S. B. BOWMAN ET AL 1,906,786
LEER LOADER
Original Filed May 26, 1928 2 Sheets-Sheet 1
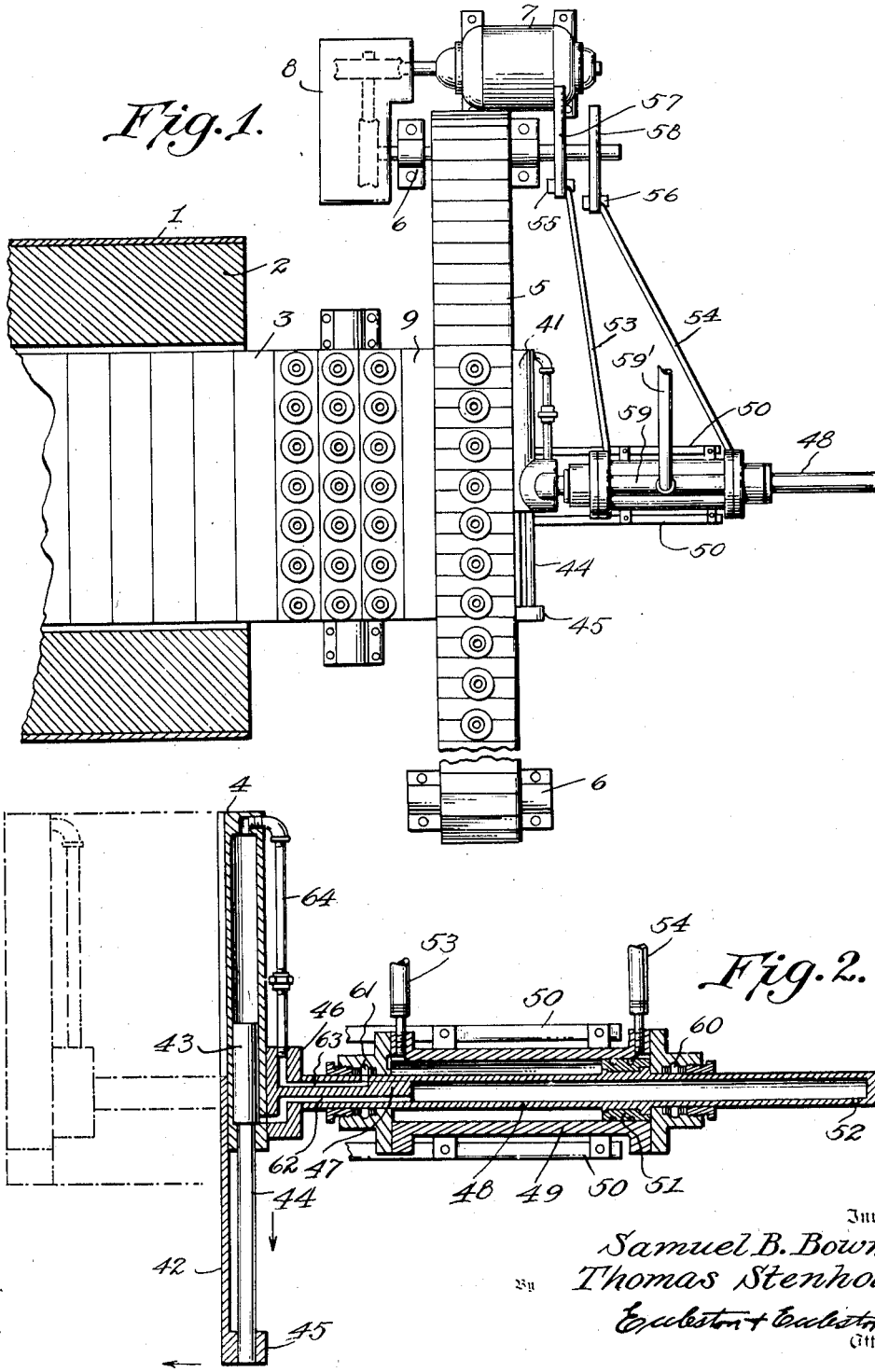

May 2, 1933.  S. B. BOWMAN ET AL  1,906,786
LEER LOADER
Original Filed May 26, 1928  2 Sheets-Sheet 2
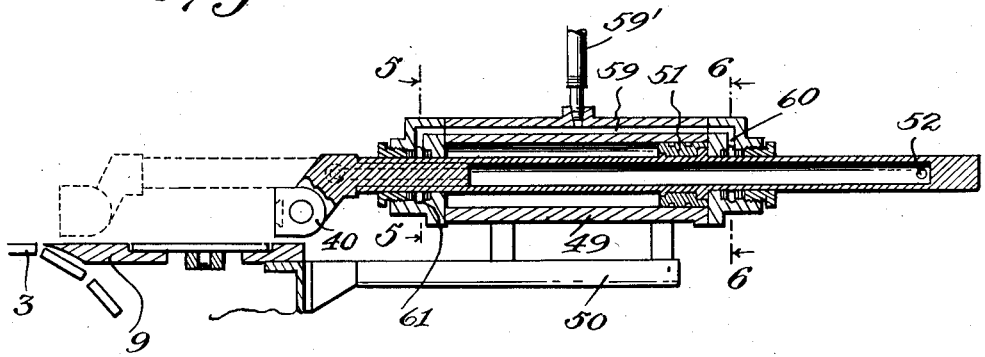
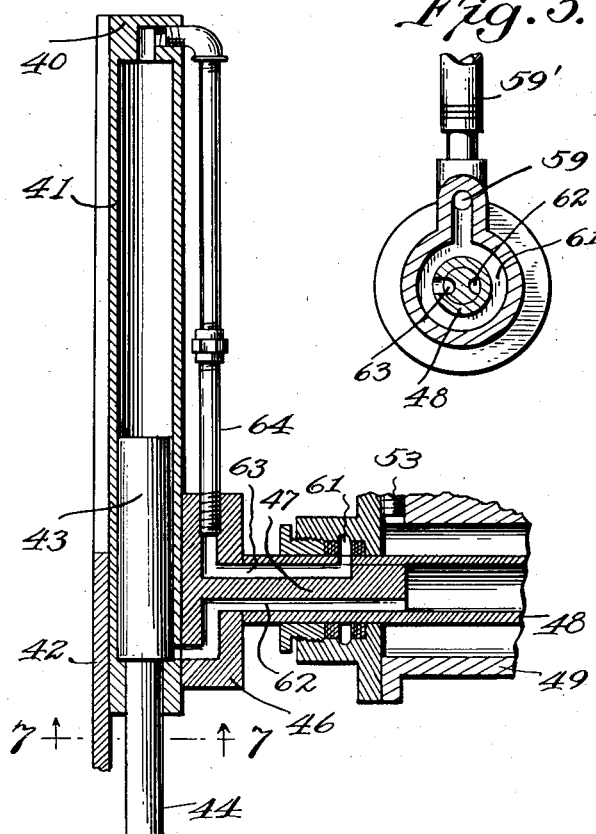
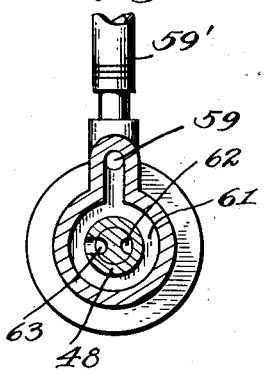
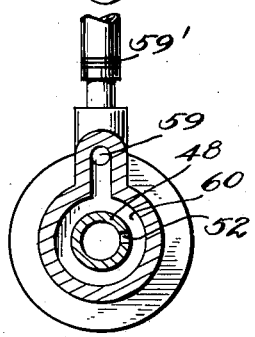
Inventor
Samuel B. Bowman
Thomas Stenhouse
By Eccleston + Eccleston
Attorney Patented May 2, 1933

1,906,786

UNITED STATES PATENT OFFICE

SAMUEL B. BOWMAN, OF ZANESVILLE, OHIO, AND THOMAS STENHOUSE, OF WASHINGTON, PENNSYLVANIA, ASSIGNORS TO HAZEL-ATLAS GLASS CO., OF WHEELING, WEST VIRGINIA, A CORPORATION OF WEST VIRGINIA

LEER LOADER

Original application filed May 26, 1928, Serial No. 280,861. Divided and this application filed April 3, 1931. Serial No. 527,510.

The present invention relates to leer loaders for use in connection with a cross-conveyer which carries the ware direct from the forming machine to a point in front of the leer, from whence it is pushed onto the leer conveyer proper, and is a division of our application Serial No. 280,861, filed May 26, 1928.

One of the objects of the invention resides in the provision of a leer loader which is so designed as to place the ware in the leer in close proximity but out of contact, so as to prevent the pieces of ware from adhering to each other due to the relatively high temperature at which the ware is introduced into the leer.

Another object of the invention consists in providing a leer loader in which the pusher bar is longitudinally contractible, being formed of slidable or collapsible sections, and which is automatically collapsed prior to the return stroke, so as to clear the oncoming ware on the cross-conveyer.

Other objects and advantages of the invention will be apparent from the following description when taken in connection with the accompanying drawings; in which Figure 1 is a fragmentary horizontal sectional view through a leer showing the loading device installed at the front thereof.

Figure 2 is a horizontal sectional view through the contractible pusher bar and its operating mechanism.

Figure 3 is a vertical sectional view through the cylinder for operating the pusher bar and showing in dotted lines the pusher bar extended into the leer.

Figure 4 is an enlarged fragmentary sectional view of the pusher bar showing the arrangement of the air conduits.

Figures 5 and 6 are sectional views through the operating cylinder taken on line 5—5 and 6—6, respectively, of Figure 3; and Figure 7 is a transverse sectional view through the pusher bar taken on line 7—7 of Figure 4.

Referring to the drawings in detail the numeral 1 designates a leer preferably provided with a lining of heat insulating material 2 and a conveyer 3 of conventional type.

The leer 1 is positioned in close proximity to a forming machine and disposed adjacent both the forming machine and the leer is a cross-conveyer 5 mounted on suitable sprocket wheels or the like supported on bearings 6 and which is operated by a suitable variable speed motor 7 connected to the driving wheel of the cross-conveyer by means of suitable reduction gearing 8. Numeral 9 (Figures 1 and 3) indicates the usual shadow pan for spanning the space between the cross-conveyer 5 and the conveyer 3 of the leer.

One of the primary difficulties of the pusher bar type of leer loader is the interference of the pusher bar with the oncoming ware on the cross-conveyer as the pusher bar is withdrawn from the leer. To avoid this difficulty we have provided an extension pusher bar indicated generally by the numeral 40, which is comprised of two sections, namely, a horizontally disposed cylinder 41 and a plate 42 which is slidably mounted on the front face of the cylinder 41 by means of the dovetail connection clearly shown in Figs. 3 and 7. Within the cylinder 41 is a piston 43 with which is connected a piston rod 44 which has its outer end fixedly secured to a boss 45 formed on that end of the plate 42 remote from the cylinder 41. It will thus be apparent that if the piston 43 is reciprocated within its cylinder 41 the pusher bar will be extended or collapsed according to the direction of movement of the piston.

The cylinder 41 is provided with an enlargement 46 which carries an extension 47 seated within a hollow piston rod 48. This piston rod is associated with a cylinder 49 mounted on brackets 50 in alignment with the front of the leer. The cylinder 49 is provided with a piston 51 which is fixed to the hollow piston rod 48 intermediate the ends of the latter; and the rod is provided with a lateral aperture 52 to permit the passage of fluid pressure to cylinder 41 at the proper time and in a manner hereinafter described.

Fluid pressure is supplied to the opposite ends of the cylinder 49 by means of conduits 53 and 54 in which are located suitable valves 55 and 56 operated by cams 57 and 58 on the drive shaft of the cross-conveyer 5. By this means it will be apparent that the pusher bar 40 may be reciprocated into and out of the leer in timed relation to the travel of the cross-conveyer. A wall of the cylinder or an enlargement thereof is also provided with a passage 59 extending lengthwise of the cylinder and communicating with annular ports 60 and 61 in the heads of the cylinder. This passage is always maintained in communication with the fluid pressure supply by means of a conduit 59'.

The boss 46 on cylinder 41 is formed with two passages 62 and 63, the former of which communicates with the interior of the hollow piston rod 48 and one end of cylinder 41. The other passage, 63, connects with a conduit 64 in communication with the opposite end of cylinder 41, and is also in communication with the annular port 61 in the adjacent cylinder head of cylinder 49. By this arrangement of ports and passages it will be apparent that when the pusher bar is in its retracted position (Figs. 2 and 3) the fluid pressure in conduit 59' passes through port 61, passage 63, and conduit 64, to that end of cylinder 41 which is remote from the boss 46 and that the pusher bar is consequently extended to its full width. It will also be noted that when the pusher bar 40 is moved into the leer the port 52 in the hollow piston rod 48 will be brought into communication with the annular port 60, and that fluid pressure will thus be communicated from conduit 59', through port 60, hollow piston rod 48, and passage 62 to the adjacent end of cylinder 41, thereby forcing piston 43 upwardly (Fig. 2) and retracting the plate 42 by reason of its sliding connection with cylinder 41.

A complete cycle of operations of this part of the leer loader will now be described.

A row of properly spaced ware having been brought into alignment with the front of the leer 1 by means of the cross-conveyer 5, fluid pressure is admitted to the rear end of cylinder 49 by means of valve 56, the operation of which is synchronized with the conveyer by reason of its cam 58 being driven by the drive shaft of the conveyer. At this time the pusher bar is in extended position by reason of the fluid pressure being admitted to that end of cylinder 41 in communication with conduit 64. The extended pusher bar is now moved forward across the cross-conveyer 5 and pushes a row of the ware from said conveyer onto the leer conveyer 3. As soon as this position is reached the aperture 52 in hollow piston rod 48 is brought into communication with the annular port 60 which thus allows fluid pressure to be conveyed through passage 62 to the opposite end of cylinder 41 thereby retracting the piston 43 and collapsing the pusher bar 40. The valve 55 is now opened by means of cam 57 and fluid pressure admitted through conduit 53 to the inner end of cylinder 49 thus moving the piston 51 outwardly and withdrawing the collapsed pusher bar to its retracted position. The bar 40 is again extended by reason of the communication of passage 63 with the annular port 61, and the complete cycle of operations repeated. It will be understood, of course, that various adjustments may be made in the valves and operating cams so as to vary as desired the time of reciprocation of the pusher bar and also the positions at which it is extended and collapsed.

From the foregoing description and the attached drawings it will be apparent that we have devised a leer loader of the pusher bar type of very simple construction, which is so operated entirely by air pressure, and which is so designed as to preclude interference with the oncoming ware during the return stroke of the pusher bar.

In accordance with the patent statutes we have described what we now believe to be the preferred form of the invention, but since various minor changes may be made in the details of construction without departing from the spirit of the invention it is intended that such changes be included within the scope of the appended claims.

What we claim is:

1. In combination with a conveyer for carrying ware across the front of a leer, a leer loader for transferring ware from the conveyer to the leer, including a pusher bar, means for periodically moving the pusher bar toward and from the leer to transfer the ware, means for increasing the length of the bar prior to its engagement with the ware to be transferred and for thereafter decreasing the length of the bar.

2. In combination with a conveyer for carrying ware across the front of a leer, a leer loader for transferring ware from the conveyer to the leer, including a pusher bar, means for periodically moving the pusher bar toward and from the leer to transfer the ware, means for increasing the length of the pusher bar to substantially the width of the leer tunnel before engaging the ware to be transferred and for reducing the bar to a length materially less than the width of the leer tunnel after the ware has been transferred.

3. A leer loader including a pusher bar formed of a plurality of sections, one section being a cylinder and another section being a plate movably mounted with respect to the cylinder, and a piston rod associated with said cylinder for operating the plate.

4. A leer loader including a pusher bar formed of a horizontally disposed cylinder and a plate slidably connected to said cylinder, and a piston rod associated with said cylinder for reciprocating said plate.

5. A leer loader including an extensible pusher bar, and a fluid pressure system for reciprocating said pusher bar and for extending and contracting the same, said system adapted to first extend the bar then move it forward, then contract the bar, and finally withdraw it from the leer.

6. A leer loader including an extensible pusher bar formed of a horizontally disposed cylinder and a plate movably mounted thereon, a piston rod associated with said cylinder for moving said plate, a second cylinder operatively connected to said bar for reciprocating the same, and means for supplying fluid pressure to the opposite ends of said cylinders in a predetermined order.

7. A leer loader including an extensible pusher bar formed of a horizontally disposed cylinder and a plate slidably mounted on the forward side of the cylinder, a piston rod associated with said cylinder and having its outer end connected to said plate for extending and collapsing the same, a second cylinder operatively connected to said first-mentioned cylinder for reciprocating the latter, and means for supplying fluid pressure to said cylinders in a predetermined order.

8. A leer loader including an extensible pusher bar formed of a horizontally disposed cylinder and a plate movably mounted thereon, a piston rod associated with said cylinder for moving said plate, a second cylinder, a piston rod in said second cylinder operatively connected to said bar for reciprocating the same, said second cylinder and piston rod provided with a plurality of fluid pressure passages by means of which fluid pressure is admitted to one end of said first-mentioned cylinder when the second-mentioned piston rod is in one position and to the opposite end of said cylinder when the second-mentioned piston rod is in another position.

SAMUEL B. BOWMAN.
THOMAS STENHOUSE.